United States Patent [19]

Destouesse et al.

[11] Patent Number: 5,359,599
[45] Date of Patent: * Oct. 25, 1994

[54] INTERFACE FOR INSERTING A SET OF EQUIPMENTS INTERCONNECTED BY A TELECOMMUNICATION NETWORK INTO A MANAGEMENT SYSTEM FOR SAID EQUIPMENTS

[75] Inventors: Claude Destouesse, Argenteuil; Jean Montarges, Fontenay le Fleury, both of France

[73] Assignee: Alcatel Telspace, Nanterre Cedex, France

[ * ] Notice: The portion of the term of this patent subsequent to Oct. 18, 1994 has been disclaimed.

[21] Appl. No.: 18,540

[22] Filed: Feb. 17, 1993

[30] Foreign Application Priority Data

Feb. 19, 1992 [FR] France ................... 9201878

[51] Int. Cl.$^5$ ............... H04L 12/24; H04L 12/46; H04Q 11/04
[52] U.S. Cl. ............... 370/58.3; 370/94.1; 370/94.3
[58] Field of Search ............... 370/54, 58.1, 60, 60.1, 370/85.13, 85.14, 85.1, 94.1, 94.3, 110.1, 58.2, 58.3; 340/826, 827, 825.02; 379/219, 220, 221, 269; 455/4.1, 4.2, 11.1, 12.1, 49.1, 51.1, 51.2, 53.1, 54.1

[56] References Cited

U.S. PATENT DOCUMENTS

| | | | |
|---|---|---|---|
| 4,933,936 | 6/1990 | Rasmussen et al. | 370/94.3 |
| 4,979,118 | 12/1990 | Kheradpir | 370/54 |
| 5,007,052 | 4/1991 | Flammer | 370/94.3 |
| 5,056,085 | 10/1991 | Vu | 370/94.1 |
| 5,138,615 | 8/1992 | Lamport et al. | 370/94.3 |
| 5,150,405 | 9/1992 | Lee et al. | 370/110.1 |

FOREIGN PATENT DOCUMENTS 2243973 11/1991 United Kingdom .

OTHER PUBLICATIONS

MILCOM 1985, vol. 2, No. 27.5, Oct. 20, 1985, Boston, US; pp. 510–514, FAUVET: "The Rita System".

*Primary Examiner*—Alpus H. Hsu
*Attorney, Agent, or Firm*—Sughrue, Mion, Zinn, Macpeak & Seas

[57] ABSTRACT

An interface for inserting equipments interconnected by a traffic telecommunication network into a management system for the equipments includes a management support telecommunication network. The system also includes, for each equipment and integrated in one and the same physical entity, an interface with the management support network and an interface with the equipment.

2 Claims, 2 Drawing Sheets

INTERFACE FOR INSERTING A SET OF EQUIPMENTS INTERCONNECTED BY A TELECOMMUNICATION NETWORK INTO A MANAGEMENT SYSTEM FOR SAID EQUIPMENTS

CROSS REFERENCE TO RELATED APPLICATIONS

This application is related to co-pending application Ser. No. 08/018,541 assigned to the same assignee.

BACKGROUND OF THE INVENTION

1. Field of the Invention

The present invention concerns the management of a set of equipments interconnected by a telecommunication network.

The present invention concerns, for example, a set of equipments interconnected by a telecommunication network in variable configurations matched to the requirements of network users, requiring exchange of management data between network units such as a network management center and the equipments constituting the network.

The invention applies to the management of a tactical telecommunication network using microwave links, for example.

2. Description of the Prior Art

A tactical network of this kind (see FIG. 1) comprises a set of nodal stations CN located at the nodes of the network and each comprising a switching unit or switch CT connected to a plurality of equipments ET which in this example are microwave link equipments connected in turn either to network users AB or to other equipments ET at other nodal stations of the network to constitute a meshed network.

Microwave links are advantageously used in a tactical network because they enable the network to be reconfigured when under attack simply by moving one or more of its nodal stations in response to such attack.

Matching a tactical telecommunication network to the requirements of users which, in military applications, include resistance to attack, requires management data to be exchanged between the various network components and in particular between a network command center CC, or more generally network management center, and the equipments constituting the network whose operation and movements must be monitored by the network command center CC.

Management data is usually exchanged in both directions, namely from the managed equipments to the command center CC and from the command center CC to the managed equipments. This data is usually called remote supervisory or alarm data in the former case and telecontrol data in the latter case. In all cases it concerns operating parameters of the managed equipments such as frequency, power output, bit rate, etc.

It is known to transmit management data using a management support telecommunication network which is so called to distinguish it from the traffic network with which this description has been concerned until now and over which traffic data is transmitted. The management support network and the traffic network may be one and the same, in which case the management network behaves like a particular group of network users. In the case of fixed infrastructure traffic networks it is also known to use a management support network separate from the traffic network to prevent blocking situations should the traffic network fail. It is also known to transmit management data over service channels set up in parallel with traffic channels. In the case of a microwave link network, for example, this parallelism can be achieved by multiplexing within the microwave frame.

In all these various cases the management data is thus usually transmitted in a point-to-point manner between the managed equipments and the management center.

It is also known to associate with an equipment to be managed, for the purpose of inserting it into a management support network, first means dedicated to implementing interface functions with the telecommunication network forming the management support network and second means dedicated to implementing interface functions with said equipment.

An object of the present invention is to combine these two interface functions in one and the same physical component or circuit board, depending on the degree of integration.

SUMMARY OF THE INVENTION

The present invention consists in an interface for inserting equipments interconnected by a traffic telecommunication network into a management system for said equipments including a management support telecommunication network, where the interface comprises, for each equipment and integrated in one and the same physical entity, means implementing an interface function with said management support network and means implementing an interface function with said equipment.

The present invention is advantageously applied to a specific management system architecture differing from those outlined above and enabling greater security of transmission of management data, especially in the event of attacks on the traffic network by which said equipments are interconnected or during network reconfiguration maneuvers.

According to another feature of the invention said management support network comprises nodes consisting of management data switching and access equipments associated with respective equipments to be managed and interconnected to form a meshed network topologically independent of said traffic network and using flooding mode broadcasting and said interface is formed by one of said management data switching and access equipments and further comprises means implementing a management data switching function.

According to another feature of the invention said management data switching function is also integrated in said one and the same physical entity.

Other objects and features of the present invention will emerge from the following description of one embodiment of the invention given by way of example for an application to a tactical telecommunication network using microwave links and the specific management system architecture mentioned above and with reference to the appended drawings.

DETAILED DESCRIPTION OF THE INVENTION

Figure 1:
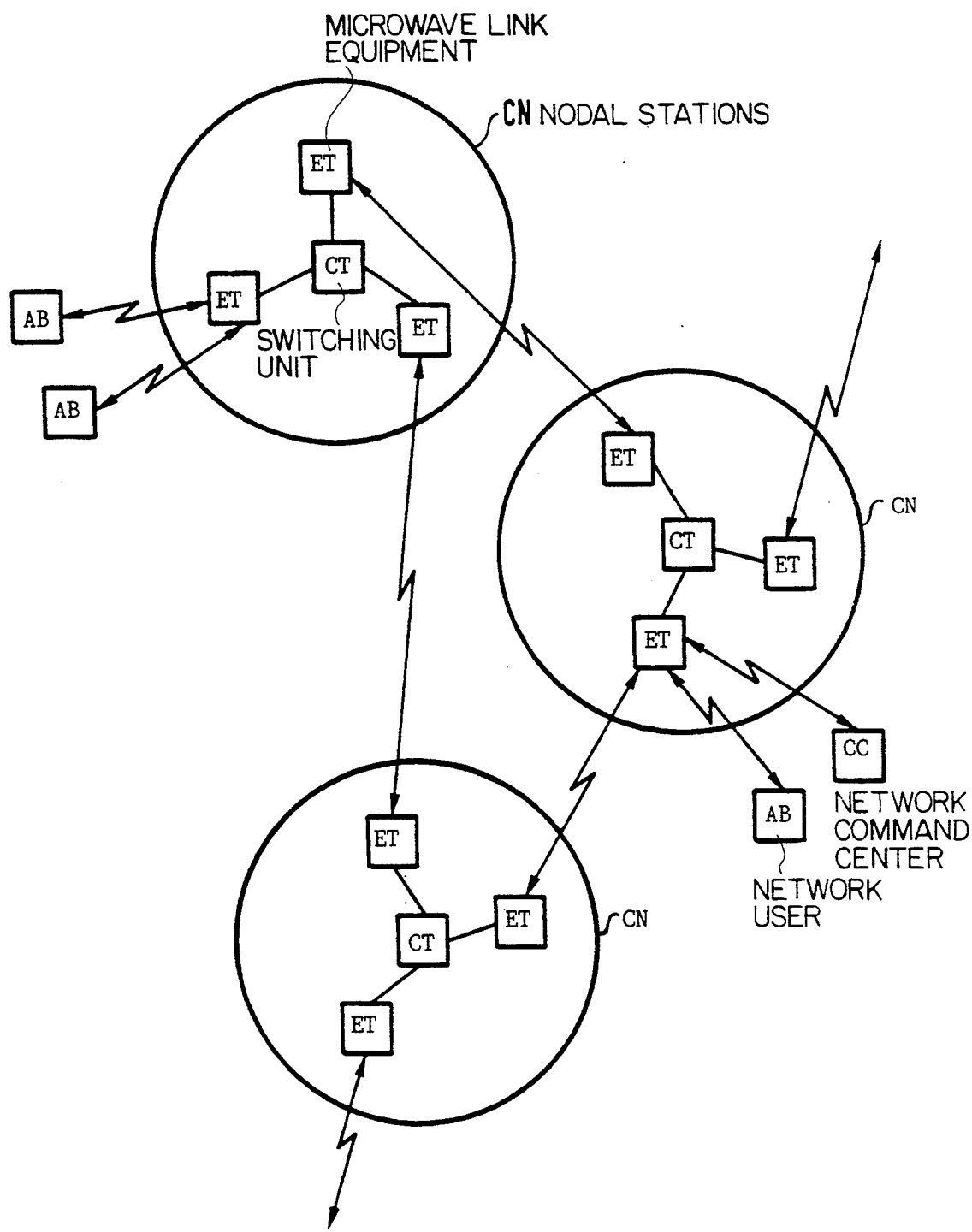
FIG. 1, already described, relates to the prior art.
Figure 2:
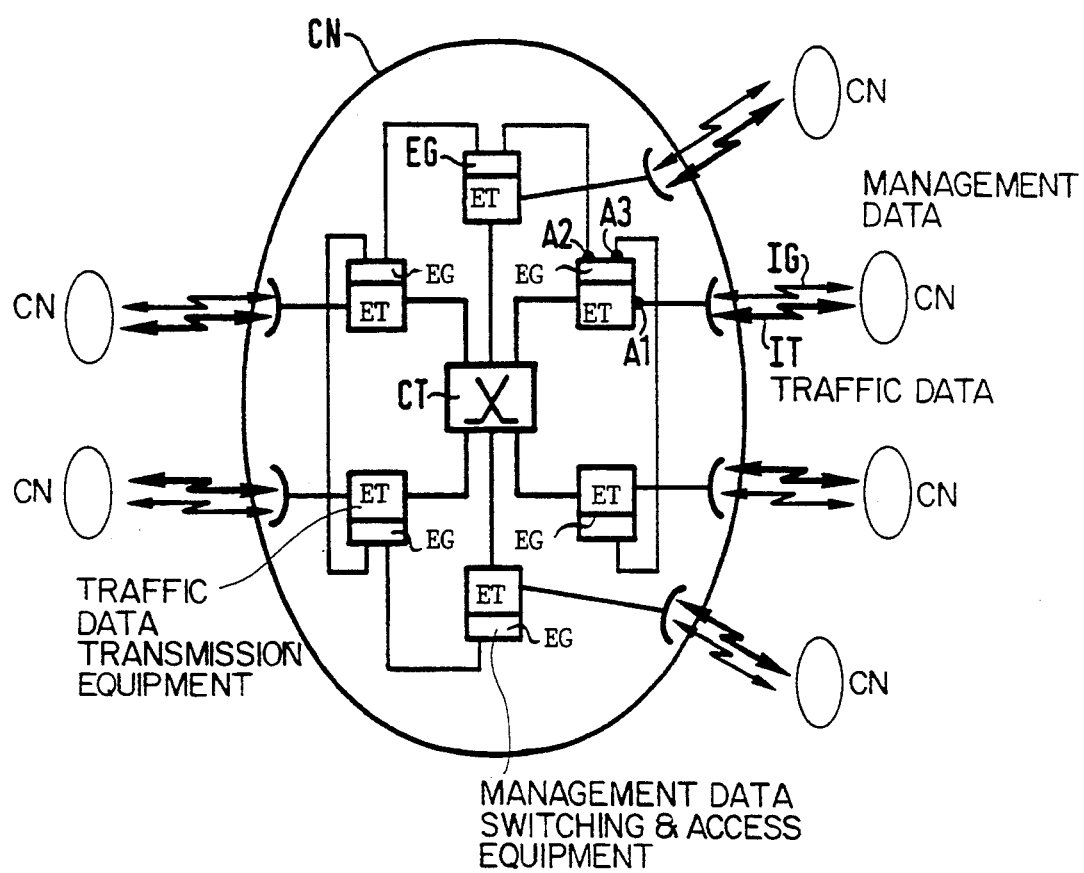
FIG. 2 is a block diagram of a nodal station in a tactical telecommunication network equipped with a management system in accordance with the invention.

The nodal station CN shown diagrammatically in FIG. 2 comprises a traffic switch CT connected to a plurality of traffic data transmission equipments ET of which there are six in this example and which constitute the equipments to be managed.

Each traffic data transmission equipment ET is associated with a management data switching and access equipment EG. These management data switching and access equipments EG constitute the nodes of a management support telecommunication network so called to distinguish it from the traffic telecommunication network carrying traffic data exchanged between network users.

Each management data switching and access equipment EG has three management support network ports or network ports connecting it to three other management data switching and access equipments EG of the management support network plus a port (not separately identified in FIG. 2) or equipment port connecting it to the management equipment.

The equipment EG in question is connected to an equipment EG of another nodal station (not shown) of the network by a network port A1 via the associated transmission equipment ET over a microwave link.

The other two network ports A2, A3 are connected by cable links to two other equipments EG at the same nodal station, in this instance the two equipments EG nearest the equipment concerned.

Note that the number of network ports may be greater than three without departing from the scope of the present invention.

Note likewise that the number of managed equipments ET associated with the same management equipment EG can be greater than one without departing from the scope of the present invention and that in this case the equipment EG would have a corresponding number of equipment ports.

The port A1 being connected via the associated equipment ET, the traffic data IT and management data IG are transmitted on different channels of the same microwave link as diagrammatically shown in FIG. 2.

The port A1 could be connected by a cable link like the ports A2 and A3 without departing from the scope of the invention.

The set of equipments EG interconnected in this way forms a meshed management support network transmitting management data between the network command center and the management data switching and access equipments associated with respective traffic data transmission equipments.

Note that the command center CC may be regarded as a special management data switching and access equipment and so can be moved within the management support network if this is reconfigured.

Figure 3:
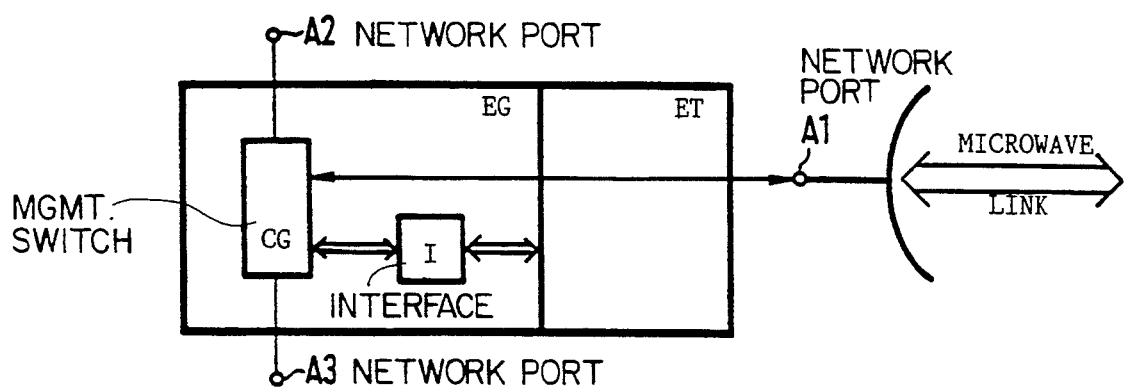
FIG. 3 is a block diagram of a management data switching and access equipment forming in said specific management system architecture an interface in accordance with the invention.

The equipment EG shown in FIG. 3 comprises a management switch CG whose network ports are the ports A1, A2, A3 and which routes management data sent by the managed equipment ET or by the command center CC over the management network.

The management switch is connected to the managed equipment ET via an interface I which formats management data received at the network ports A1, A2 and A3 for the equipment ET in a form suitable for its reception by this equipment and management data sent by the equipment ET in a form suited to its transmission from the management switch ports A1, A2 and A3.

Management data is routed over the management support network in the known "flooding" broadcast mode whereby an equipment EG which receives such data on any of the three network ports retransmits it once from both the other ports which guarantees redundant routing of such data. If an equipment EG is the originator of data sent in this way it sends the data directly from the three network ports.

In the case of transmission of management data using the known packet-switched transmission mode, the management switch CG is a packet switch, for example, the interface I being in this case a packet assembler-disassembler. The management switch, which has a low capacity given its restricted number of ports, and this interface are advantageously implemented on the same component or circuit board (depending on the degree of integration).

In the case of implementation on a circuit board, for example, the board carries means defining an interface with the managed equipment and with the management network and means defining a management message switching function, in this example a packet switching function, utilizing the "flooding" routing technique.

At the interface with the managed equipment the circuit board formats remote supervisory and telecontrol messages at the managed equipment input and output.

At the interface with the management network this circuit board:

sends remote supervisory messages originating from the equipment, recognizes messages addressed to the managed equipment and processes them so that they can be forwarded to that equipment, manages acknowledgement of messages addressed to the managed equipment.

The circuit board may be either integrated into the equipment to be managed or housed in a separate unit.

There is claimed:

1. An interface system for inserting traffic data transmission equipments interconnected by a traffic telecommunication network into a management system comprising a management support telecommunication network for said traffic data transmission equipments and having a plurality of nodes constituted by management data switching and access equipments associated with respective traffic data transmission equipments managed by said management support telecommunication network and said management data switching and access equipments being interconnected to form a meshed network topologically independent of said network, said meshed network using flooding mode broadcasting for transmitting management data, where said interface system is formed by one of said management data switching and access equipments and comprises, for each traffic data transmission equipment and integrated in one and the same physical entity, means for interfacing with said management support network, means for interfacing with said traffic data transmission equipment and means for implementing a management data switching function.

2. An interface system according to claim 1 wherein said management data switching function is also integrated in said one and the same physical entity.

* * * * *